United States Patent
Hotta

(10) Patent No.: US 11,461,094 B2
(45) Date of Patent: Oct. 4, 2022

(54) NON-TRANSITORY COMPUTER-READABLE STORAGE MEDIUM FOR STORING WARNING MATCHING PROGRAM, WARNING MATCHING METHOD, AND WARNING MATCHING DEVICE

(71) Applicant: FUJITSU LIMITED, Kawasaki (JP)

(72) Inventor: Keisuke Hotta, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/306,947

(22) Filed: May 4, 2021

(65) Prior Publication Data

US 2022/0027150 A1 Jan. 27, 2022

(30) Foreign Application Priority Data

Jul. 27, 2020 (JP) .............................. JP2020-126518

(51) Int. Cl.
*G06F 8/75* (2018.01)
(52) U.S. Cl.
CPC ....................................... *G06F 8/75* (2013.01)
(58) Field of Classification Search
CPC . G06F 8/71; G06F 8/75; G06F 21/562; G06F 21/56
See application file for complete search history.

(56) References Cited

U.S. PATENT DOCUMENTS

| 2014/0331202 | A1 | 11/2014 | Fukuda et al. | |
| 2016/0299831 | A1* | 10/2016 | Cimadamore | G06F 8/75 |
| 2018/0095746 | A1* | 4/2018 | Henriksen | G06F 11/3616 |
| 2018/0276103 | A1* | 9/2018 | Woulfe | G06F 8/75 |
| 2019/0196934 | A1* | 6/2019 | Sisman | G06F 11/362 |
| 2019/0227902 | A1* | 7/2019 | Cheng | G06F 8/75 |

FOREIGN PATENT DOCUMENTS

| JP | 2003-216425 A | 7/2003 |
| JP | 2013-546090 A | 12/2013 |
| WO | 2012/079230 A1 | 6/2012 |
| WO | 2013/088461 A1 | 6/2013 |

OTHER PUBLICATIONS

Avgustinov et al., "Tracking Static Analysis Violations Over Time to Capture Developer Characteristics", 37th IEEE International Conference on Software Engineering (ICSE), 2015, pp. 437-447.

* cited by examiner

*Primary Examiner* — Wei Y Zhen
*Assistant Examiner* — Amir Soltanzadeh
(74) *Attorney, Agent, or Firm* — Xsensus LLP

(57) ABSTRACT

A computer-readable recording medium having stored therein a warning matching program for causing a computer to execute a process including: determining whether or not a pre-modification location where a pre-modification warning is output by a static analysis tool in a pre-modification source code and a post-modification location where a post-modification warning is output by the static analysis tool in a post-modification source code are used in same processing; and associating the pre-modification warning with the post-modification warning based on a result of determining whether or not the pre-modification location and the post-modification location are used in the same processing.

7 Claims, 16 Drawing Sheets

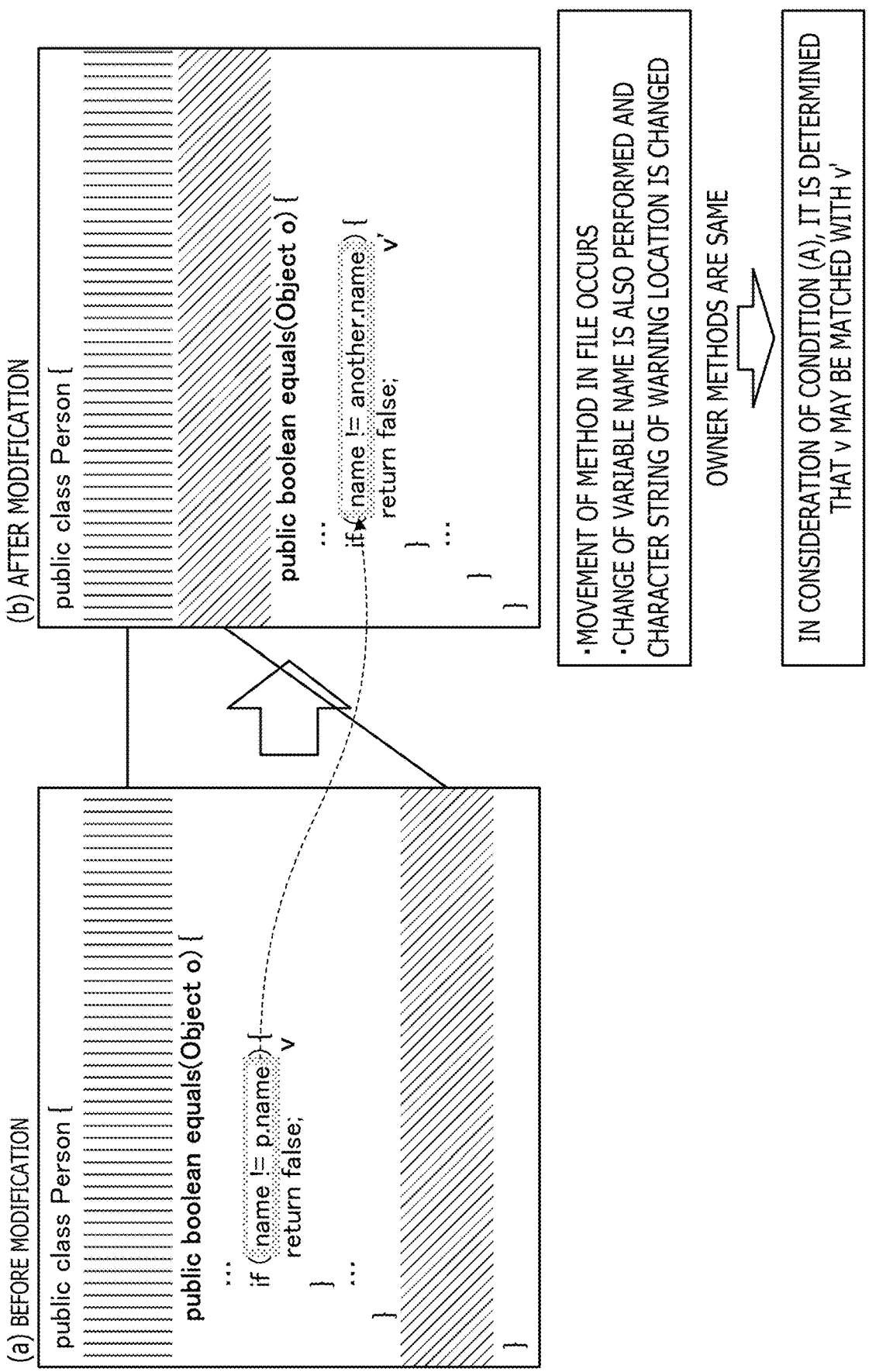

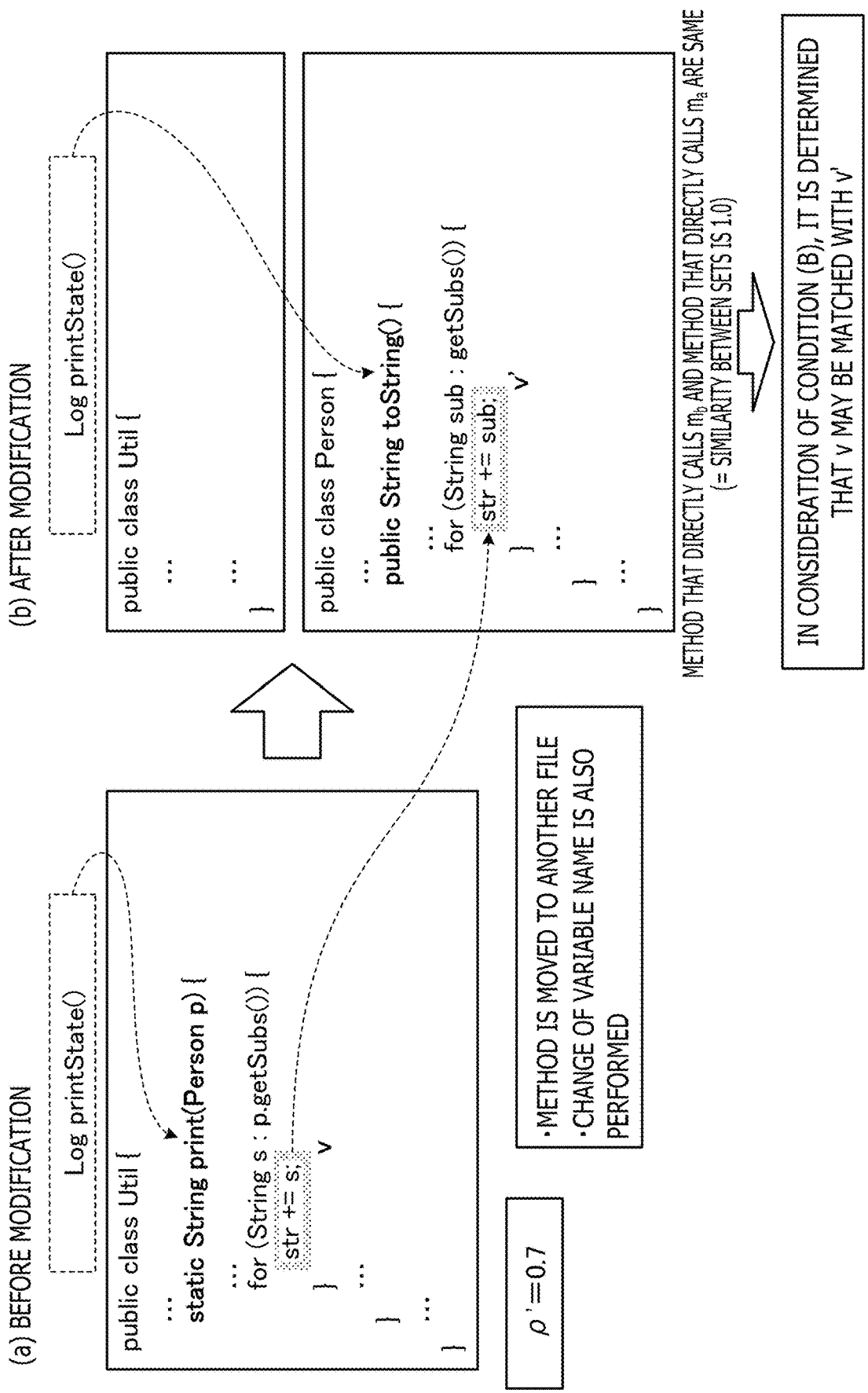

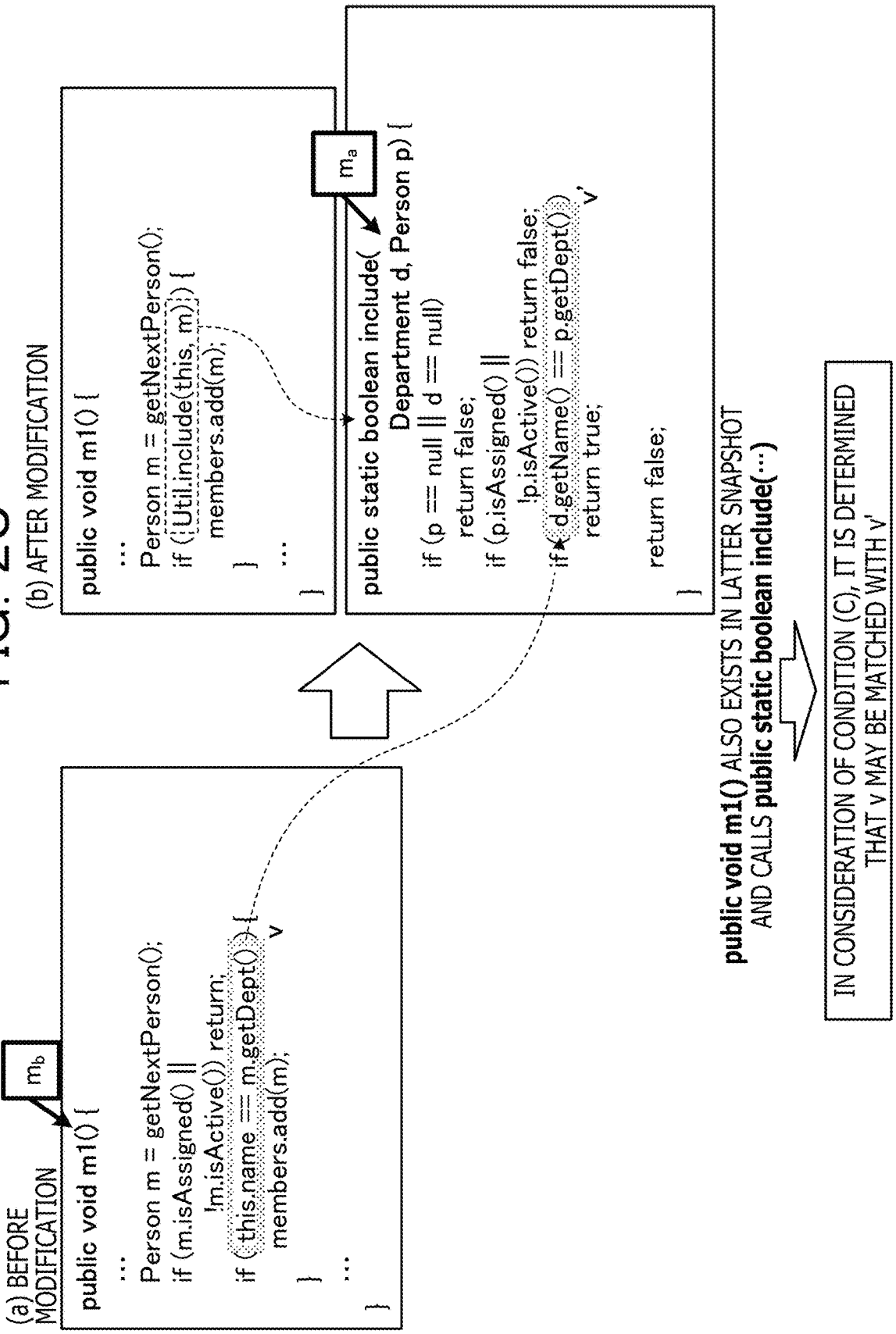

FIG. 4

| ID | WARNING TYPE | SNAPSHOT NUMBER | FILE PATH | START LINE NUMBER | END LINE NUMBER |
|---|---|---|---|---|---|
| 1 | WMI_WRONG_MAP_ITERATOR | a0b814c03 | src/main/java/com/sample/Main.java | 102 | 102 |
| ... | ... | ... | ... | ... | ... |

FIG. 5

| ID | FORMER SNAPSHOT NUMBER | FORMER WARNING ID | LATTER SNAPSHOT NUMBER | LATTER WARNING ID |
|---|---|---|---|---|
| 1 | a0b814c03 | 1 | 69d217ca0 | 3 |
| ... | ... | ... | ... | ... |

FIG. 7B

(a) BEFORE MODIFICATION

```
public void m1() {
    ...
    Person m = getNextPerson();
    if (m.isAssigned() ||
        !m.isActive()) return;
    if (this.name == m.getDept()) {    v
        members.add(m);
    }
    ...
}
```

(b) AFTER MODIFICATION

```
public void m1() {
    ...
    Person m = getNextPerson();
    if (Util.include(this, m)) {
        members.add(m);
    }
    ...
} public static boolean include(
        Department d, Person p) {
    if (p == null || d == null)
        return false;
    if (p.isAssigned() ||
        !p.isActive()) return false;
    if (d.getName() == p.getDept())    v'
        return true;
    return false;
}
``` v AND v' ARE MATCHING CANDIDATES $$\text{SIMILARITY} = \frac{2 \times \text{LCS}(l_1, l_2)}{|l_1| + |l_2|} = \frac{2 \times 17}{20 + 20} = 0.85 > \rho$$

| ( | ) | ! | if | ( | isActive | ) | ) | $ | if | ( | isAssigned | ) | $ | ( | ) | ; |
| false | ; | ! | $ | | | | | | | | | | | | return | ; |

| ( | ) | if | ( | isActive | ) | ) | $ | if | ( | isAssigned | ) | ( | ) | ; |
| | | | | | | | isActive | | | | | | | return | false |

$n = 20$ $\rho = 0.8$

NON-TRANSITORY COMPUTER-READABLE STORAGE MEDIUM FOR STORING WARNING MATCHING PROGRAM, WARNING MATCHING METHOD, AND WARNING MATCHING DEVICE

CROSS-REFERENCE TO RELATED APPLICATION

This application is based upon and claims the benefit of priority of the prior Japanese Patent Application No. 2020-126518, filed on Jul. 27, 2020, the entire contents of which are incorporated herein by reference.

FIELD

The embodiments discussed herein are related to a non-transitory computer-readable storage medium storing a warning matching program, a warning matching method, and a warning matching device.

BACKGROUND

There is a source code static analysis tool (hereinafter referred to as a static analysis tool) that analyzes a source code, detects a location that needs improvement, and outputs a warning. For example, the static analysis tool detects a location where the wrong operation is performed when the source code is executed and a location where the processing is not efficient and outputs a warning.

When the source code is modified, there is a technique for matching the warning output in the source code before modification with the warning output in the source code after modification. By using this matching technique it is possible to identify warnings that are not output in the source code after modification from the warnings output in the source code before modification, and for the identified warnings, the source code after modification is a modification example. By learning such a modification example, it is possible to automatically propose a modification for the warning.

There are three ways described below to match the warning output in the source code before modification with the warning output in the source code after modification. Note that, in the three matchings described below, a snapshot is a source code of one version when there is a plurality of versions due to modification. •Match warnings that are close to each other in the same file of the former and latter snapshots. •Match warnings of the same character string in the same file of the former and latter snapshots. •Match warnings whose character strings located before and after the warning location are the same in the former and latter snapshots.

Note that, as a conventional technique, there is a technique for supporting an understanding of changes by processing two versions of a source code using code clone detection and classifying changes between the two versions.

Also, as a conventional technique, there is a similarity measurement system that measures similarity between two texts. This similarity measurement system examines the same patterns between files that make up two texts, extracts a set of files that have the same pattern, and obtains a pair of lines that may match between the sets of extracted files. Then, this similarity measurement system obtains the ratio between the sum of the number of lines of the two texts and the sum of the number of lines considered to be able to match in each text as the similarity.

Also, as a conventional technique, there is a technique for extracting the dependency of a variable or function from each of the two source codes to create a graph structure consisting of nodes and links, measuring the similarity of the graph structure corresponding to each of the two source codes, and displaying the measured similarity as an image.

Examples of the related art include Japanese National Publication of International Patent Application No. 2013-546090, Japanese Laid-open Patent Publication No. 2003-216425, International Publication Pamphlet No. WO 2013/088461, and Pavel Avgustinov, Arthur I. Baars, Anders Starcke Henriksen, R. Greg Lavender, Galen Menzel, Oege de Moor, Max Schafer, Julian Tibble, "*Tracking Static Analysis Violations over Time to Capture Developer Characteristics*", ICSE (1), 437-447, 2015.

However, there are cases where matching may not be achieved with the three matching ways described above. FIGS. 13A and 13B are diagrams illustrating cases where matching may not be achieved. Diagram (a) represents a state before the modification, and diagram (b) represents a state after the modification. In FIGS. 13A and 13B, "name", "p.name" and "person.name" are character type variables. Expression "name==p.name" is a process intended to determine whether or not two character strings are equal, but in reality, whether or not the address of "name" and the address of "p.name" are equal is determined. The same applies to expression "name==person.name". Therefore, a warning is output for expressions "name==p.name" and "name==person.name".

In the example of FIG. 13A, the warning location has been moved in the file and the character string at the warning location has been changed. The movement of the warning location in the file occurs, for example, when the method including the warning location is moved. Even when the method itself including the warning location is not changed, the warning location may be moved due to changes in the surroundings. The change of the character string occurs, for example, by renaming a variable name and adding, deleting, changing, and the like a method call argument.

As illustrated in FIG. 13A, the warning locations before and after the modification are not located close to each other, the character strings of the warning locations are not the same, and the character strings located before and after the warning location are not the same. Therefore, matching on the warning locations before and after the modification is not performed even though it is desirable to preform matching.

In the example of FIG. 13B, the warning location and its vicinity are cut out to another file. Such a change occurs, for example, when the warning location and its vicinity are cut out as a utility method. In such a cutout, there are cases that the entire method including the warning location is cut out or only a part thereof may be cut out. The cut-out method is called as newMethod(p) from the cutout source.

Since the change in FIG. 13B is the cutout to the other file and the warning location is included in the other file, it is not possible to match the warnings by the method for performing matching in the same file. Also, by cutting out, the code around the cut-out location changes, and the character strings located before and after the warning location are not the same. Therefore, matching on the warning locations before and after the modification is not performed even though it is desirable to preform matching.

According to an aspect of the present embodiment disclosed below, there is provided a solution to accurately match the warning before modification with the warning after modification.

SUMMARY

According to an aspect of the embodiments, a computer-readable recording medium having stored therein a warning matching program for causing a computer to execute a process of warning matching. In an example, the process includes: determining whether or not a pre-modification location where a pre-modification warning is output by a static analysis tool in a pre-modification source code and a post-modification location where a post-modification warning is output by the static analysis tool in a post-modification source code are used in same processing; and associating the pre-modification warning with the post-modification warning based on a result of determining whether or not the pre-modification location and the post-modification location are used in the same processing.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2A is a diagram illustrating an example in which condition (A) is satisfied;

FIG. 2B is a diagram illustrating an example in which condition (B) is satisfied;

FIG. 2C is a diagram illustrating an example in which condition (C) is satisfied;

FIG. 4 is a diagram illustrating an example of a warning data storage unit;

FIG. 5 is a diagram illustrating an example of a matching data storage unit;

FIG. 7B is a second diagram illustrating an example of filtering processing;

DESCRIPTION OF EMBODIMENTS

Hereinafter, embodiments of a warning matching program, a warning matching method, and a warning matching device disclosed in the present application will be described in detail with reference to the drawings. Note that the embodiments do not limit the technology disclosed.

Embodiments

Figure 1:
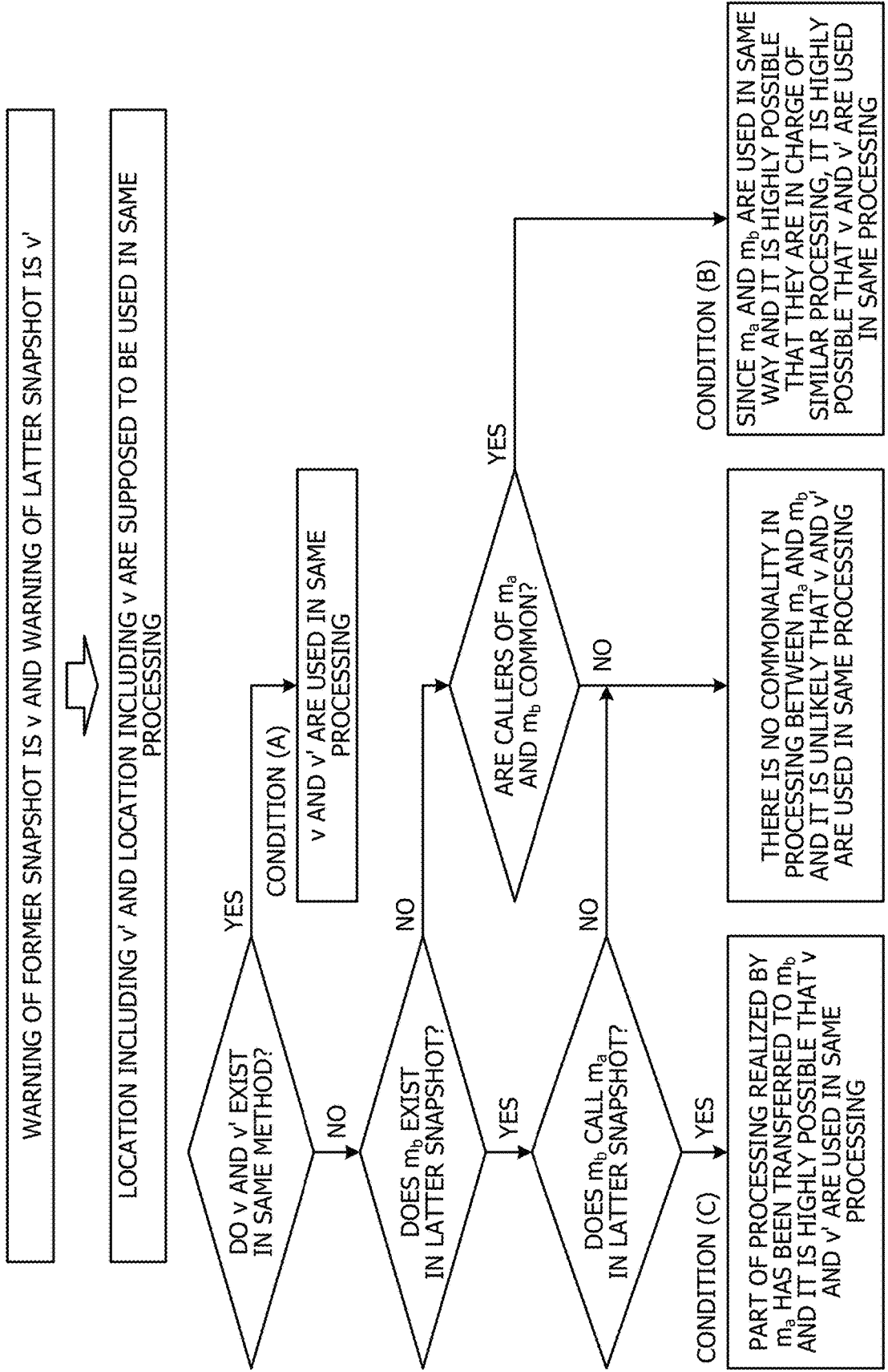
FIG. 1 is a diagram for explaining a determination criterion when a warning matching device according to an embodiment matches a warning before modification with a warning after modification.

First, a determination criterion when the warning matching device according to the embodiment matches (associates) the warning before modification with the warning after modification will be described with reference to FIGS. 1 to 2C. FIG. 1 is a diagram for explaining a determination criterion when a warning matching device according to an embodiment matches a warning before modification with a warning after modification. In FIG. 1, a pre-modification warning, which is a warning of a former snapshot, is v, and the post-modification warning, which is a warning of a latter snapshot, is v'. Let $m_b$ be a pre-modification method that is a method that includes v, and $m_a$ be the post-modification method that is a method that includes v'. Signs "b" and "a" of the index represent "before" and "after", respectively.

The warning matching device according to the embodiment matches v with v' based on a determination criterion that a location including v' and a location including v are supposed to be used in the same processing when v and v' match. Here, the location including v is the location where v is output by the static analysis tool.

For example, the warning matching device according to the embodiment determines that matching may be achieved when any one of the following conditions is satisfied. (A) $m_b$ and $m_a$ are the same.

(B) When the set of methods that directly call $m_b$ and $m_a$ is $C_b$ and $C_a$, the inter-set similarity of $C_b$ and $C_a$ is equal to or greater than the reference value ρ', and the set similarity is, for example, Dice coefficient=$(2*|C_b \cap C_a|)/(|C_b|+|C_a|)$, in which $|C_b|$ is the number of elements of $C_b$, $|C_a|$ is the number of elements of $C_a$, and $|C_b \cap C_a|$ is the number of elements of the common set of $C_b$ and $C_a$.

(C) $m_b$ also exists in the latter snapshot, and $m_b$ of the latter snapshot calls $m_a$ directly.

Condition (A) is when the warning location moves within the same method. Condition (B) is when $m_b$ moves. Condition (C) is when a part of $m_b$ is cut out as $m_a$.

As illustrated in FIG. 1, condition (A) is satisfied when v and v' exist in the same method, and since v and v' are used in the same processing, the warning matching device according to the embodiment determines that matching may be achieved. Here, the description that v and v' are used in the same processing means that the location including v' and the location including v are used in the same processing.

Also, when $m_b$ does not exist in the latter snapshot and the callers of $m_a$ and $m_b$ are common (the inter-set similarity of $C_a$ and $C_b$ is equal to or greater than the reference value ρ'), the warning matching device according to the embodiment determines that condition (B) is satisfied. Then, since $m_a$ and $m_b$ are used in the same way and it is highly possible that they are in charge of similar processing, the warning matching device according to the embodiment determines that it is highly possible that they are used in the same processing. Then, the warning matching device according to the embodiment determines that matching may be achieved.

Also, when $m_b$ exists in the latter snapshot and $m_b$ calls $m_a$ in the latter snapshot, the warning matching device according to the embodiment determines that condition (C) is satisfied Then, since a part of the processing realized by $m_a$ has been transferred to $m_b$ and it is highly possible that v and v' are used in the same processing, the warning matching device according to the embodiment determines that matching may be achieved.

FIG. 2A is a diagram illustrating an example in which condition (A) is satisfied. The warning locations are shaded. As illustrated in FIG. 2A, method "equals" including v has been moved. Also, the variable name "p.name" has been changed to "another.name". Since the method that owns v and the method that owns v' are the same, the warning matching device according to the embodiment determines that v may be matched with v'.

FIG. 2B is a diagram illustrating an example in which condition (B) is satisfied. As illustrated in FIG. 2B, method "print" including v has been moved to another file. Also, the name of the method has been changed to "toString". Method "print" and method "toString" are called from method "printState". Therefore, the inter-set similarity of method "print" and method "toString" is 1.0. Since condition (B) is satisfied when the reference value ρ' is 0.7, the warning matching device according to the embodiment determines that v may be matched with v'.

FIG. 2C is a diagram illustrating an example in which condition (C) is satisfied. As illustrated in FIG. 2C, the statement including the if statement where v is output is cut out and new method "include" is created in another file. Since method "m1" exists in the latter snapshot and calls method "include", condition (C) is satisfied and the warning matching device according to the embodiment determines that v may be matched with v'.

Figure 3:
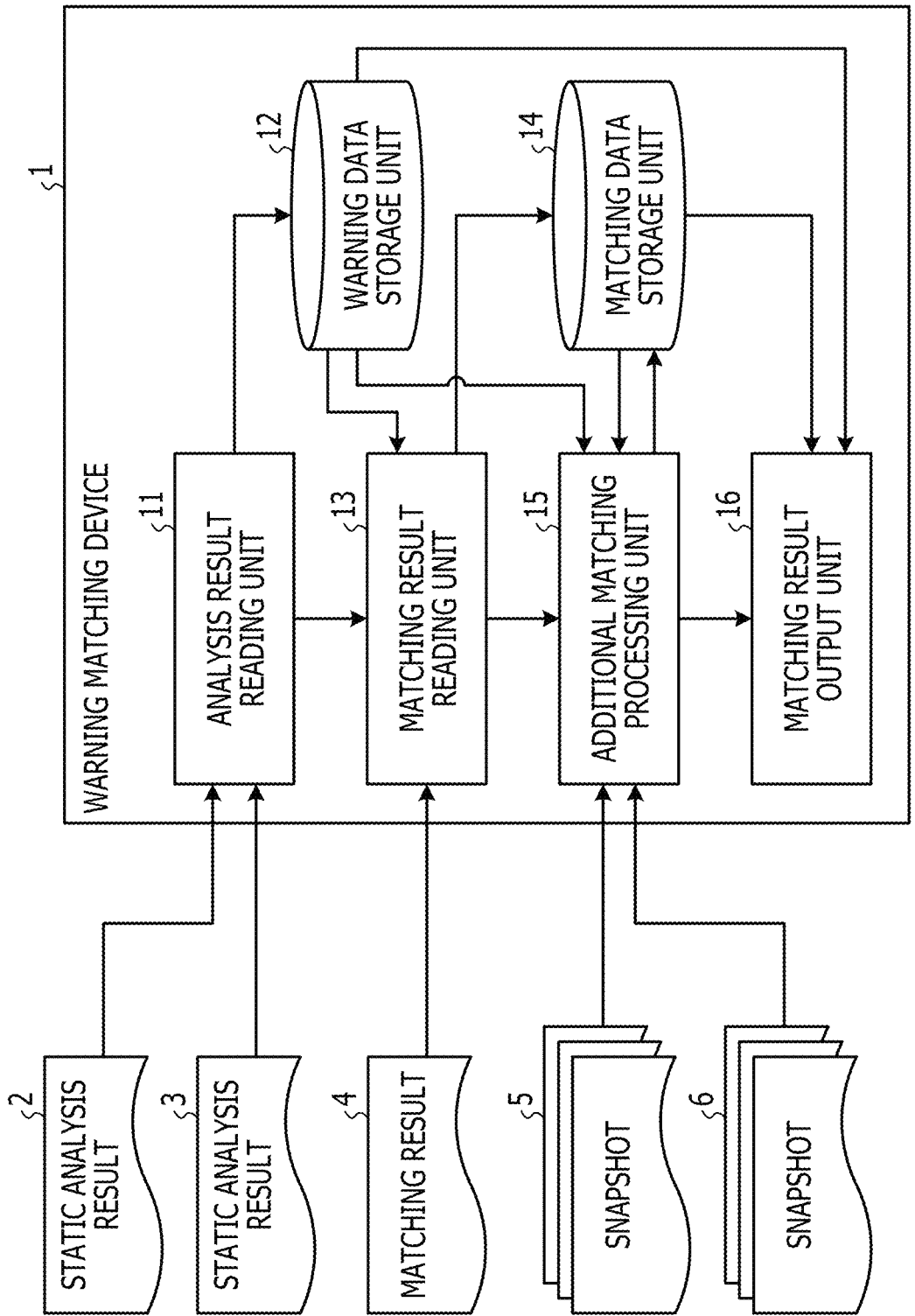
FIG. 3 is a diagram illustrating a functional configuration of the warning matching device according to an embodiment.

Next, a functional configuration of the warning matching device according to the embodiment will be described. FIG. 3 is a diagram illustrating a functional configuration of the warning matching device according to the embodiment. As illustrated in FIG. 3, a warning matching device 1 according to the embodiment includes an analysis result reading unit 11, a warning data storage unit 12, a matching result reading unit 13, a matching data storage unit 14, an additional matching processing unit 15, and a matching result output unit 16.

The analysis result reading unit 11 reads a static analysis result 2 which is an analysis result of the snapshot 5 by the static analysis tool and a static analysis result 3 which is the analysis result of the snapshot 6 and stores them in the warning data storage unit 12 as warning data. The analysis result reading unit 11 reads, for example, each of the static analysis result 2 and the static analysis result 3 from a file based on two file paths specified by a user using a keyboard or mouse. The snapshot 5 and the snapshot 6 are consecutive snapshots in a series of snapshots.

Here, it is assumed that snapshot 5 is the former snapshot and snapshot 6 is the latter snapshot. Therefore, a warning included in the static analysis result 2 is the pre-modification warning, and a warning included in the static analysis result 3 is the post-modification warning. Also, snapshots include a plurality of files.

The warning data storage unit 12 stores warning data. FIG. 4 is a diagram illustrating an example of the warning data storage unit 12. As illustrated in FIG. 4, the warning data storage unit 12 stores an identifier (ID), a warning type, a snapshot number, a file path, a start line number, and an end line number for each warning in association with each other.

The ID is an identifier that identifies the warning. The warning type indicates the type of warning. The snapshot number is a number that identifies the snapshot that includes the warning. The file path is a path to a file that stores the snapshot. The start line number is the number of the line where the warning location starts. The end line number is the number of the line where the warning location ends.

For example, for a warning whose ID is identified by "1", the type is "WMI_WRONG_MAP_ITERATOR", and the snapshot including the warning is identified by "a0b814c03". Also, the path to the file that stores the snapshot is "src/main/java/com/sample/Main.java", the start line number of the warning location is "102", and the end line number of the warning location is "102".

The matching result reading unit 13 reads a matching result 4 by the matching tool, refers to the warning data storage unit 12, creates matching data, and stores it in the matching data storage unit 14. The matching result reading unit 13, for example, reads the matching result 4 from a file based on a file path specified by the user using the keyboard or mouse.

The matching tool creates a matching result 4 by matching between the pre-modification warning and the post-modification warning based on the related matching method, for example, the following matching method. •Match warnings that are close to each other in the same file of snapshots 5 and 6. •Match warnings of the same character string in the same file of snapshots 5 and 6. •Match warnings that the character strings located before and after the warning location are the same in snapshots 5 and 6.

The matching data storage unit 14 stores matching data created based on the result of matching between the pre-modification warning and the post-modification warning. The matching data storage unit 14 stores matching data created based on the matching result 4 and matching data created based on the result of additional matching performed by the additional matching processing unit 15.

FIG. 5 is a diagram illustrating an example of the matching data storage unit 14. As illustrated in FIG. 5, the matching data storage unit 14 stores an ID, the former snapshot number, a former warning ID, the latter snapshot number, and a latter warning ID for each matching.

The ID is an identifier that identifies the matching. The former snapshot number is a number that identifies the snapshot 5. The former warning ID is an identifier that identifies the pre-modification warning. The latter snapshot number is a number that identifies the snapshot 6. The latter warning ID is an identifier that identifies the post-modification warning.

For example, for a matching identified by an ID "1", the number that identifies the former snapshot is "a0b814c03", and the number that identifies the pre-modification warning is "1". Also, the number that identifies the latter snapshot is "69d217ca0", and the number that identifies the post-modification warning is "3".

The additional matching processing unit 15 identifies additional matching for all combinations of the pre-modification warning and the post-modification warning based on the warning data stored in the warning data storage unit 12, the snapshot 5, and the snapshot 6. Then, the additional matching processing unit 15 stores matching data related to the additional matching in the matching data storage unit 14.

The additional matching processing unit 15 reads, for example, the snapshot 5 from a plurality of files based on a plurality of file paths specified by the user using the keyboard or mouse. Similarly, the additional matching processing unit 15 reads the snapshot 6 from a plurality of files based on a plurality of file paths specified by the user using the keyboard or mouse. The additional matching processing unit 15 accepts, for example, a value specified by the user using the keyboard or mouse as a reference value ρ' of the inter-set similarity.

Figure 6:
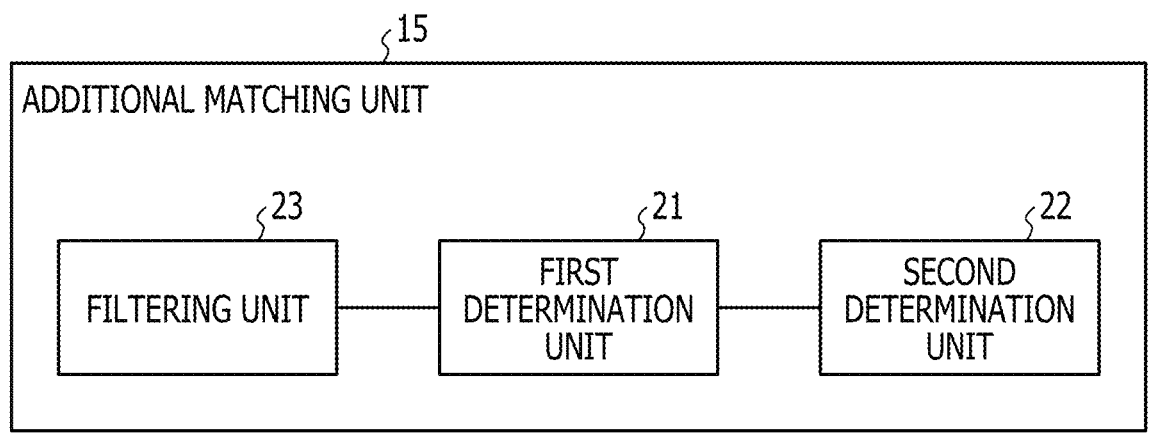
FIG. 6 is a diagram illustrating a functional configuration of an additional matching processing unit.

The additional matching processing unit 15 specifies matching that satisfies any one of condition (A), condition (B), and condition (C). FIG. 6 is a diagram illustrating a functional configuration of the additional matching processing unit 15. As illustrated in FIG. 6, the additional matching processing unit 15 includes a first determination unit 21, a second determination unit 22, and a filtering unit 23.

The first determination unit 21 determines whether or not a pre-modification location where the pre-modification warning v is output and the post-modification location where the post-modification warning v' is output are used in the same processing. The first determination unit 21 determines that the pre-modification location and the post-modification location are used in the same processing when any one of condition (A), condition (B), and condition (C) is satisfied. The first determination unit 21 determines whether or not condition (B) or condition (C) is satisfied based on the call relationship between pre-modification method $m_b$ and post-modification method $m_a$.

The second determination unit 22 determines that the pre-modification warning and the post-modification warning match when the first determination unit 21 determines that the pre-modification location and the post-modification location are used in the same processing and associates the pre-modification warning with the post-modification warning.

The filtering unit 23 filters the combination of the pre-modification warning and the post-modification warning by using the similarity of surrounding codes of each of the pre-modification location and the post-modification location and the like. The first determination unit 21 identifies additional matching for the set of pre-modification warning and post-modification warning filtered by the filtering unit 23. Note that the additional matching processing unit 15 may not include the filtering unit 23, and the first determination unit 21 may identify additional matching for all combinations of the pre-modification warning and the post-modification warning.

The filtering unit 23 extracts, for example, n tokens from the line before and after the warning location and replaces a variable name in the extracted token sequence with a special character (for example, $). Here, n is a parameter specified in advance. The parameter n is, for example, 20. The tokens are lexical. Then, the filtering unit 23 calculates the similarity of n token sequences in the line ahead or line behind between the two warning locations and regards the two warnings as matching candidates when the similarity of the n token sequence ahead or the similarity of the n token sequence behind is equal to or greater than the predetermined reference value $\rho$. The filtering unit 23 accepts, for example, two values specified by the user using the keyboard or mouse as the parameter n and reference value $\rho$.

The similarity between two token sequences is defined by, for example, similarity=$(2*|LCS(I_1, I_2)|)/(|I_1|+|I_2|)$. Here, $I_1$ and $I_2$ are two token sequences. $|LCS(I_1, I_2)|$ is the length of the longest common subsequence of $I_1$ and $I_2$. $|I_1|+|I_2|$ is the sum of the length of $I_1$ and the length of $I_2$. The two warnings regarded as the matching candidates by the filtering unit 23 are subject to determination by the first determination unit 21.

Figure 7A:
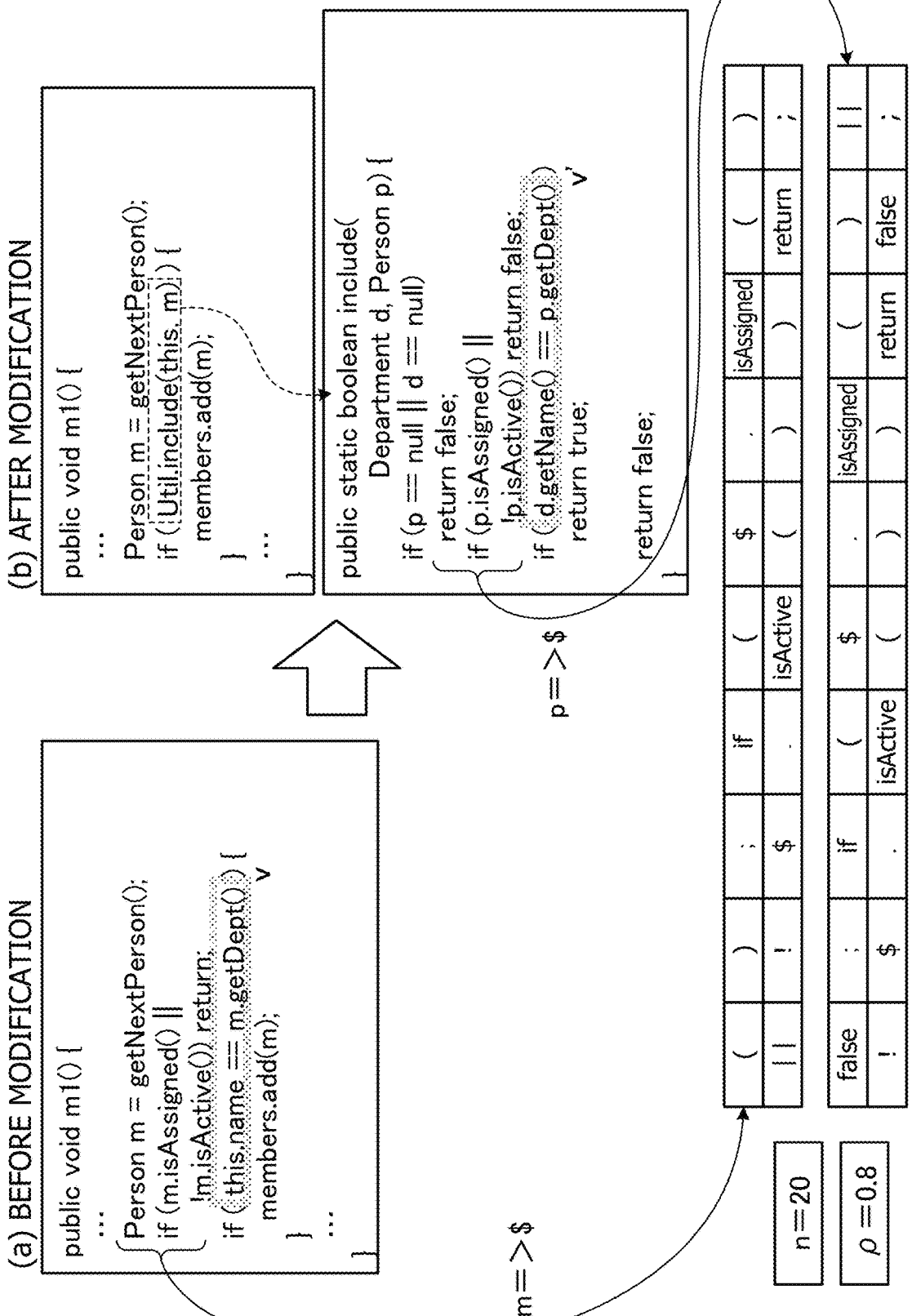
FIG. 7A is a first diagram illustrating an example of filtering processing.

FIGS. 7A and 7B are diagrams illustrating examples of filtering processing. In FIGS. 7A and 7B, the similarity of 20 tokens before the warning location is calculated. As illustrated in FIG. 7A, in the pre-modified source code, the warning location is "this.name==m.getDept( )", so the 20 tokens in the line before the warning location are "(", ")", ";", "if", "(", ..., "return", and ";". Note that the variable name "m" has been replaced with "$". On the other hand, in the post-modified source code, the warning location is "d.get-Name( )==p.getDept( )", so the 20 tokens in the line before the warning location are "false", ";", "if", "(", "$", ..., "false", and ";". Note that the variable name "p" has been replaced with "$".

As illustrated in FIG. 7B, the longest common subsequence of the two token sequences is ";" "if" "(" "$" "." "isassigned" "(" ")" "||" "!" "$" "." "isActive" "(" ")" ")" "return". Therefore, the length of the longest common subsequence of the two token sequences is 17, so the similarity is calculated as similarity=$(2*17)/(20+20)$=0.85. When the reference value $\rho$ is 0.8, the similarity≥$\rho$, so v and v' are matching candidates.

Returning to FIG. 3, the matching result output unit 16 outputs warnings existing in both snapshots before and after the modification, including the correspondence between the warnings, based on the matching data stored in the matching data storage unit 14. Also, the matching result output unit 16 outputs a warning that exists only in the former snapshot or a warning that exists only in the latter snapshot, based on the warning data stored in the warning data storage unit 12 and the matching data stored in the matching data storage unit 14.

Figure 8:
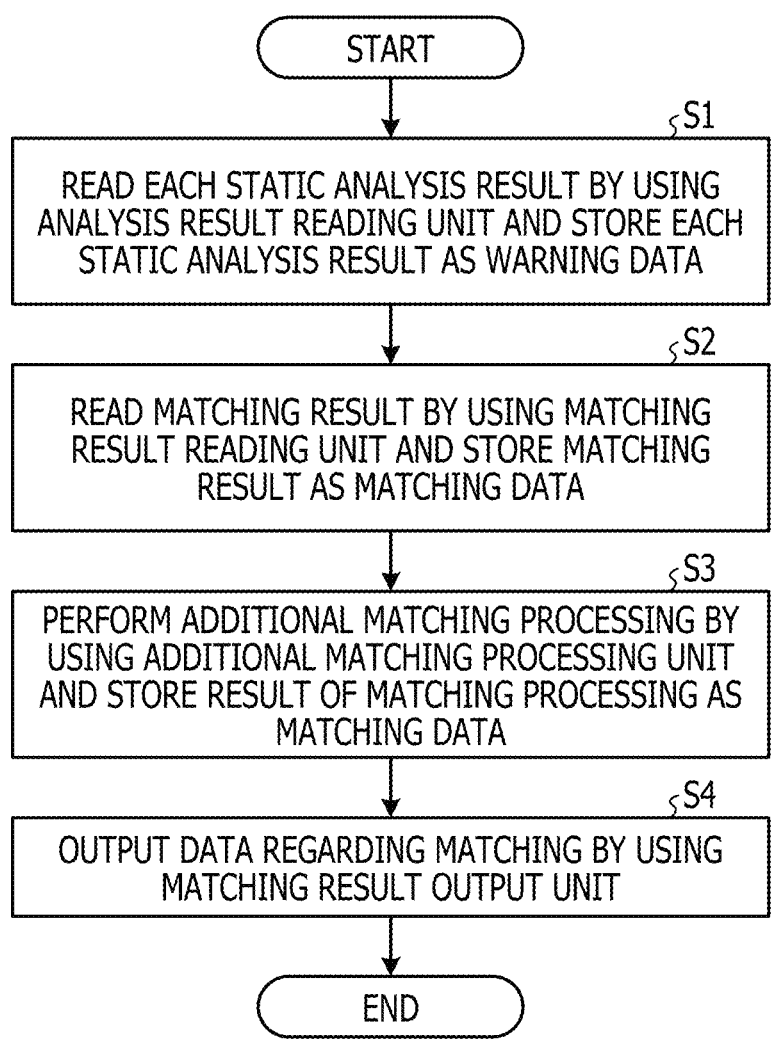
FIG. 8 is a flowchart illustrating a processing flow by the warning matching device.

Next, a processing flow by the warning matching device 1 will be described with reference to FIGS. 8 to 11. FIG. 8 is a flowchart illustrating a processing flow by the warning matching device 1. As illustrated in FIG. 8, the warning matching device 1 reads each static analysis result by using the analysis result reading unit 11 and stores each static analysis result as warning data (step S1). Then, the warning matching device 1 reads the matching result 4 by using the matching result reading unit 13 and stores the matching result 4 as matching data (step S2). Then, the warning matching device 1 performs additional matching processing by using the additional matching processing unit 15 and stores the result of the matching processing as matching data (step S3). Then, the warning matching device 1 outputs data related to matching by using the matching result output unit 16 (step S4).

As described above, since the warning matching device 1 performs the additional matching processing by using the additional matching processing unit 15, it is possible to perform the warning matching accurately.

Figure 9:
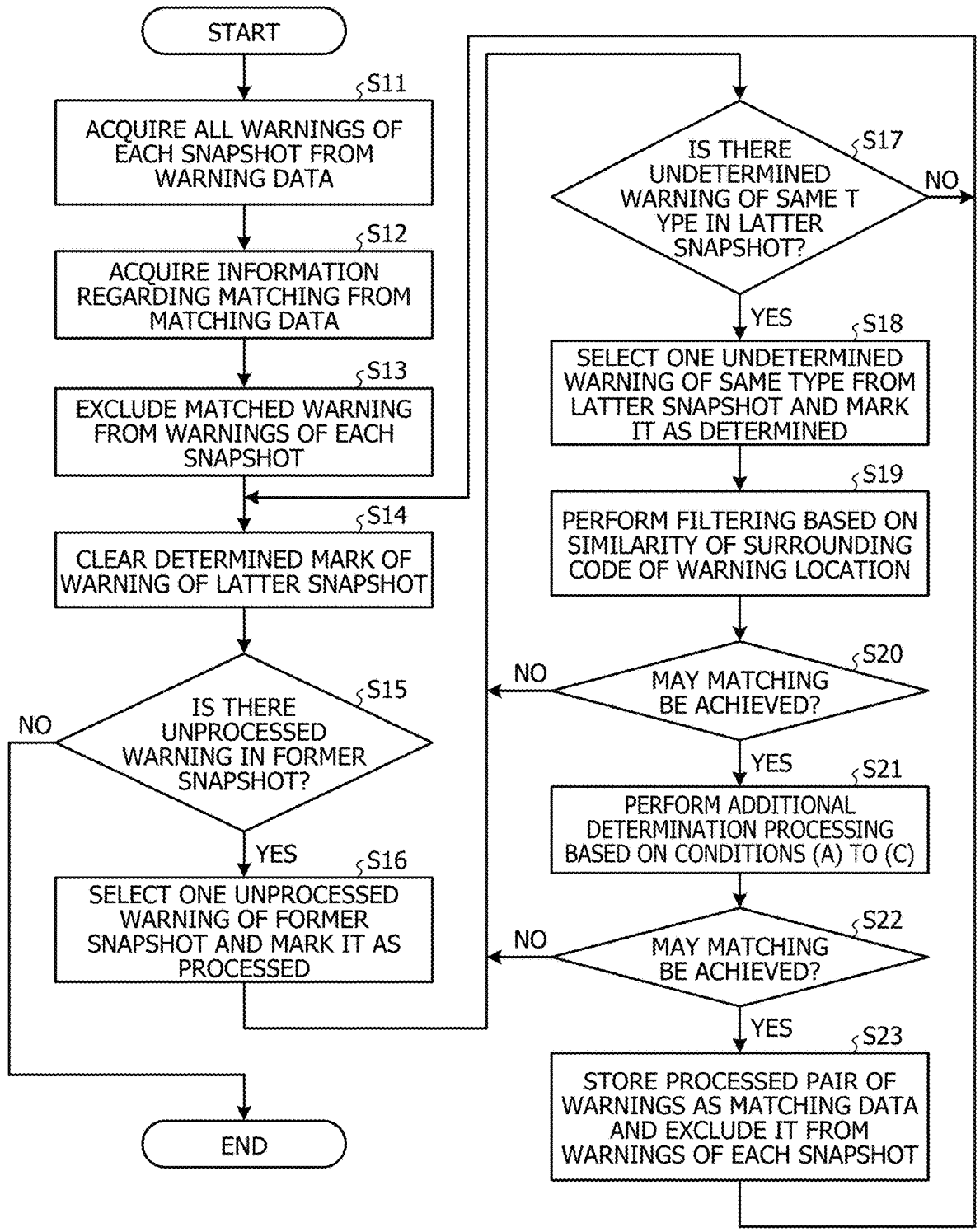
FIG. 9 is a flowchart illustrating a processing flow by the additional matching processing unit.

FIG. 9 is a flowchart illustrating a processing flow by the additional matching processing unit 15. As illustrated in FIG. 9, the additional matching processing unit 15 acquires all warnings of each snapshot from the warning data (step S11) and acquires the information regarding matching from the matching data (step S12). Then, the additional matching processing unit 15 excludes the matched warning from the warnings of each snapshot (step S13) and clears a determined mark of the warning of the latter snapshot (step S14).

Then, the additional matching processing unit 15 determines whether or not there is an unprocessed warning in the former snapshot (step S15), and if not, ends the processing. On the other hand, if there is an unprocessed warning in the former snapshot, the additional matching processing unit 15 selects one unprocessed warning of the former snapshot and marks it as processed (step S16). Then, the additional matching processing unit 15 determines whether or not there is an undetermined warning of the same type in the latter snapshot for the selected warning (step S17), and if not, returns to step S14.

On the other hand, when there is an undetermined warning of the same type in the latter snapshot, the additional matching processing unit 15 selects one undetermined warning of the same type from the latter snapshot and marks it as determined (step S18). Then, the additional matching processing unit 15 performs filtering based on the similarity of the surrounding codes of the warning location (step S19) and determines whether or not matching may be achieved (step S20). Then, when matching may not be achieved, the additional matching processing unit 15 returns to step S17.

On the other hand, when matching may be achieved, the additional matching processing unit 15 executes additional determination processing based on conditions (A) to (C) (step S21) and determines whether or not matching may be achieved (step S22). Then, when matching may not be achieved, the additional matching processing unit 15 returns to step S17.

On the other hand, when matching may be achieved, the additional matching processing unit 15 stores the processed warning pair as matching data and excludes it from the warnings of each snapshot (step S23). Then, the additional matching processing unit 15 returns to step S14.

In this way, since the additional matching processing unit 15 performs the additional determination processing based on conditions (A) to (C), the warning matching device 1 may accurately match the warnings.

Figure 10:
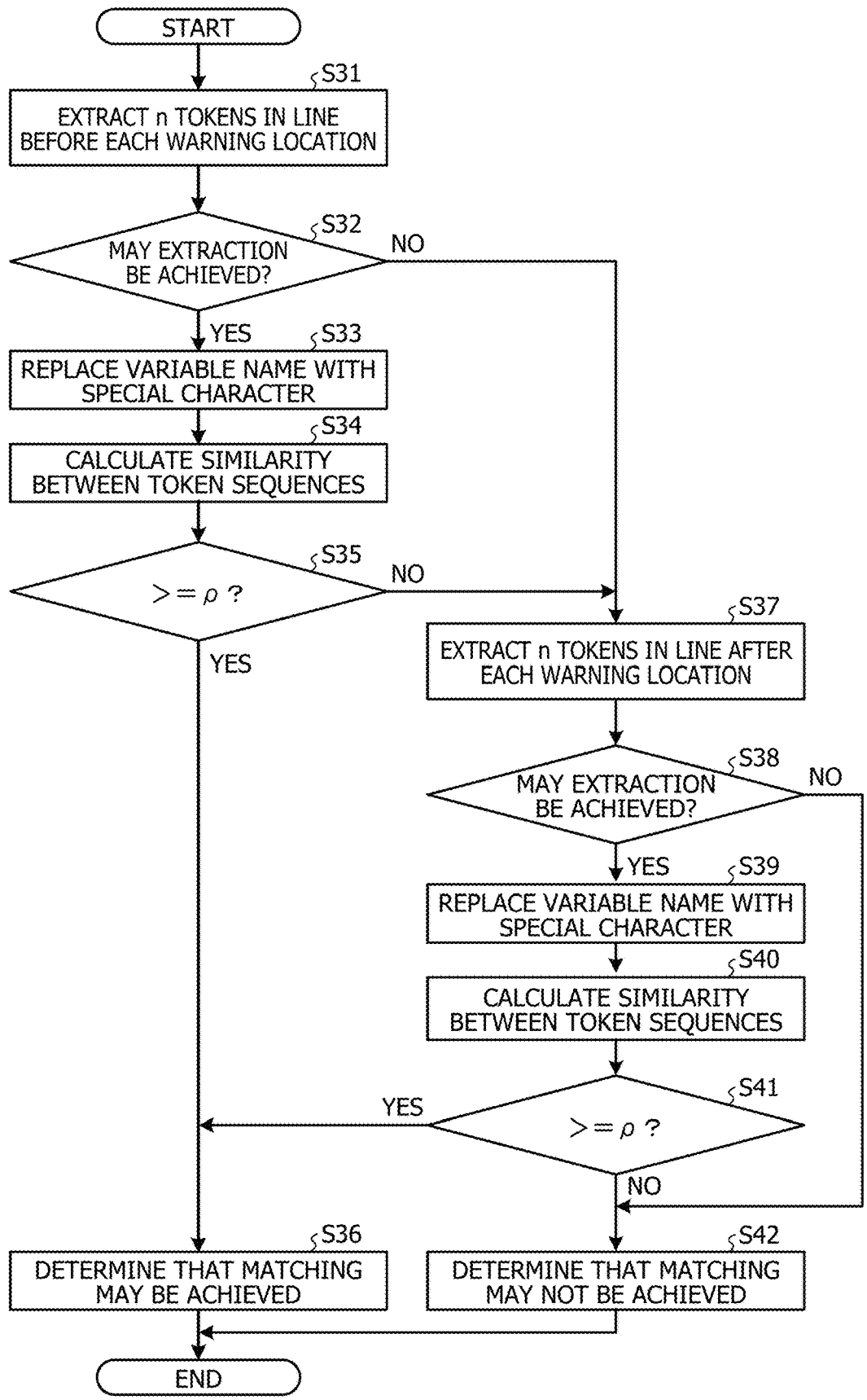
FIG. 10 is a flowchart illustrating a flow of processing for performing filtering based on the similarity of surrounding codes of a warning location.

FIG. 10 is a flowchart illustrating a flow of processing for performing filtering based on the similarity of surrounding codes of the warning location. The processing of performing filtering based on the similarity of the surrounding codes of the warning location is the processing represented in step S19 of FIG. 9. As illustrated in FIG. 10, the additional matching processing unit 15 extracts n tokens in the line before each warning location (step S31), and determines whether or not the extraction may be achieved (step S32). Then, when the extraction may not be achieved, the additional matching processing unit 15 moves to step S37.

On the other hand, when the extraction may be achieved, the additional matching processing unit 15 replaces the variable name included in the extracted token sequence with a special character (step S33) and calculates the similarity between the token sequences (step S34). Then, the additional matching processing unit 15 determines whether or not the calculated similarity is equal to or greater than the reference value $\rho$ (step S35), and when it is equal to or greater than the reference value $\rho$, it is determined that matching may be achieved (step S36).

On the other hand, when the calculated similarity is not equal to or greater than the reference value $\rho$, the additional matching processing unit 15 extracts the n tokens in the line after each warning location (step S37) and determines whether or not the extraction may be achieved (step S38). Then, when the extraction may not be achieved, the additional matching processing unit 15 determines that it is not possible to achieve the matching.

On the other hand, when the extraction may be achieved, the additional matching processing unit 15 replaces the variable name included in the extracted token sequence with a special character (step S39) and calculates the similarity between the token sequences (step S40). Then, the additional matching processing unit 15 determines whether or not the calculated similarity is equal to or greater than the reference value $\rho$ (step S41), and when it is equal to or greater than the reference value $\rho$, it is determined that matching may be achieved (step S36). On the other hand, if the calculated similarity is not equal to or greater than the reference value $\rho$, the additional matching processing unit 15 determines that it is not possible to achieve the matching (step S42).

In this way, since the additional matching processing unit 15 performs filtering based on the similarity of the surrounding codes of the warning locations, the warning matching device 1 may accurately match the warnings.

Figure 11:
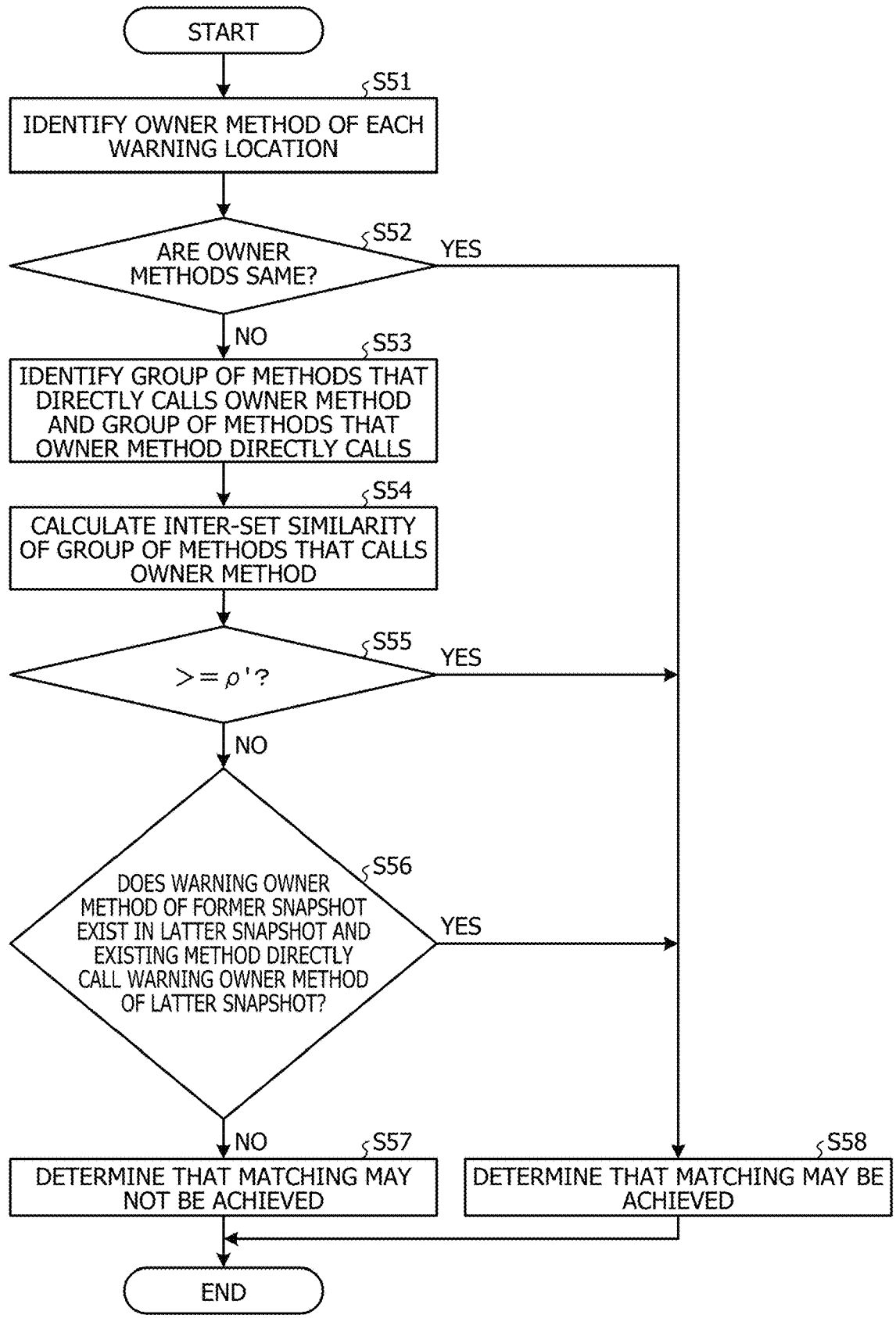
FIG. 11 is a flowchart illustrating a flow of additional determination processing based on conditions (A) to (C)

FIG. 11 is a flowchart illustrating a flow of additional determination processing based on conditions (A) to (C). The additional determination processing based on conditions (A) to (C) is the processing represented in step S21 of FIG. 9. As illustrated in FIG. 11, the additional matching processing unit 15 identifies an owner method of each warning location (step S51) and determines whether or not the owner methods are the same (step S52). Then, if the owner methods are the same, the additional matching processing unit 15 determines that matching may be achieved (step S58).

On the other hand, when the owner methods are not the same, the additional matching processing unit 15 identifies a group of methods that directly call the owner method and a group of methods that the owner method directly calls for each snapshot (step S53). Then, the additional matching processing unit 15 calculates the inter-set similarity of the method group that calls the owner method (step S54) and determines whether or not the calculated inter-set similarity is equal to or greater than the reference value $\rho'$ (step S55). Then, when it is equal to or greater than the reference value $\rho'$, the additional matching processing unit 15 determines that matching may be achieved (step S58).

On the other hand, when it is not equal to or greater than the reference value $\rho'$, the additional matching processing unit 15 determines whether or not a warning owner method of the former snapshot exists in the latter snapshot and the existing method directly calls the warning owner method of the latter snapshot (step S56). Then, when the warning owner method of the former snapshot does not exist in the latter snapshot or when the existing method does not directly call the warning owner method of the latter snapshot, the additional matching processing unit 15 determines that matching may not be achieved (step S57). On the other hand, when the warning owner method of the former snapshot exists in the latter snapshot and the existing method directly calls the warning owner method of the latter snapshot, the additional matching processing unit 15 determines that matching may be achieved (step S58).

In this way, since the additional matching processing unit 15 performs the additional determination processing based on conditions (A) to (C), the warning matching device 1 may accurately match the warnings.

As described above, in the embodiment, the first determination unit 21 determines whether or not the pre-modification location including the pre-modification warning v and the post-modification location including the post-modification warning v' are used in the same processing. Then, when it is determined that the pre-modification location and the post-modification location are used in the same processing by the first determination unit 21, the second determination unit 22 determines that the pre-modification warning v and the post-modification warning v' match and associates the pre-modification warning v with the post-modification warning v'. Therefore, the warning matching device 1 may accurately associate the pre-modification warning v and the post-modification warning v'.

Also, in the embodiment, the first determination unit 21 determines whether or not the pre-modification location and the post-modification location are used in the same processing by determining whether or not the pre-modification method $m_b$ and the post-modification method $m_a$ are the same. Therefore, the first determination unit 21 may accurately determine whether or not the pre-modification location and the post-modification location are used in the same processing.

Also, in the embodiment, the first determination unit 21 determines whether or not the pre-modification location and the post-modification location are used in the same processing by determining a call relationship between the pre-modification method $m_b$ and the post-modification method $m_a$. Therefore, the first determination unit 21 may accurately determine whether or not the pre-modification location and the post-modification location are used in the same processing.

Also, in the embodiment, the first determination unit 21 determines whether or not the pre-modification location and the post-modification location are used in the same processing by determining the set similarity between the set of methods that call the pre-modification method $m_b$ and the set of methods that call the post-modification method $m_a$ as the call relationship. Therefore, the first determination unit 21 may accurately determine whether or not the pre-modification location and the post-modification location are used in the same processing.

Also, in the embodiment, the first determination unit 21 determines whether or not the pre-modification location and the post-modification location are used in the same processing by determining whether or not the same method as $m_b$ is included in the latter snapshot and the same method as $m_b$ calls $m_a$ as the call relationship. Therefore, the first determination unit 21 may accurately determine whether or not the pre-modification location and the post-modification location are used in the same processing.

Also, in the embodiment, the filtering unit 23 calculates the code similarity between the source code around the pre-modification location and the source code around the post-modification location. Then, the first determination unit 21 determines whether or not the pre-modification location and the post-modification location are used in the same processing when the code similarity is equal to or greater than the reference value ρ. Therefore, the warning matching device 1 may accurately associate the pre-modification warning v and the post-modification warning v'.

Note that, although the warning matching device 1 has been described in the embodiment, it is possible to obtain a warning matching program having a similar function by realizing the configuration that the warning matching device 1 has by software. Therefore, a computer that executes the warning matching program will be described.

Figure 12:
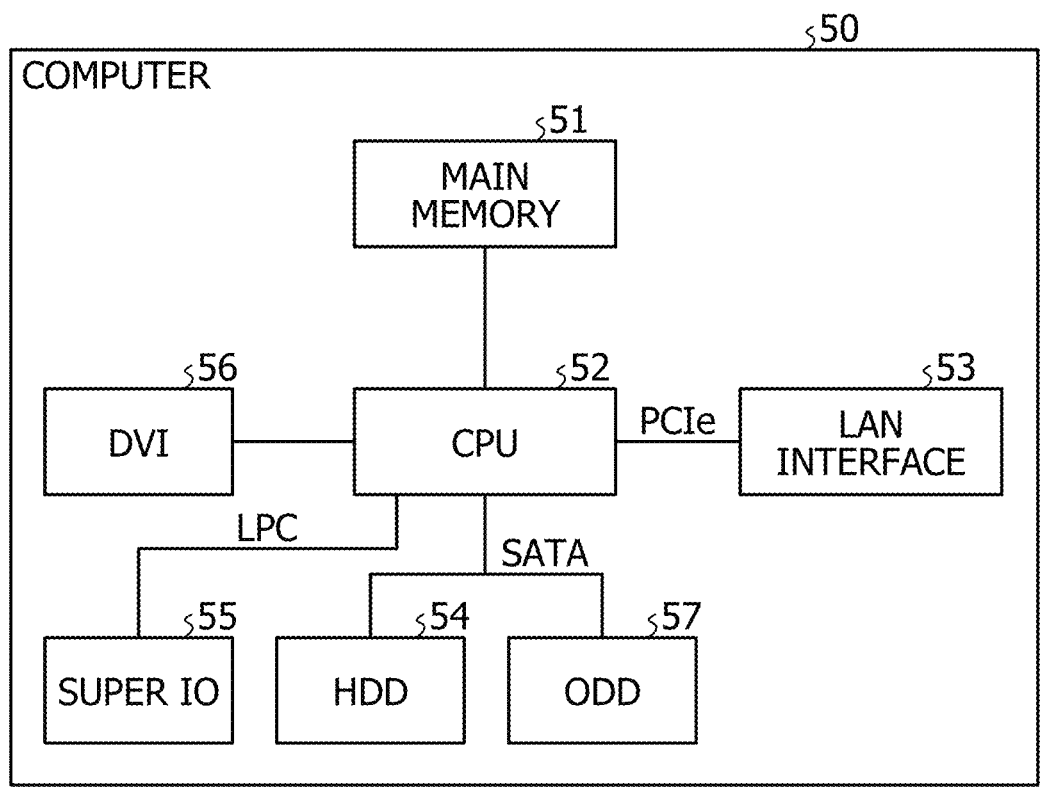
FIG. 12 is a diagram illustrating a hardware configuration of a computer that executes a warning matching program according to an embodiment.
Figure 13A:
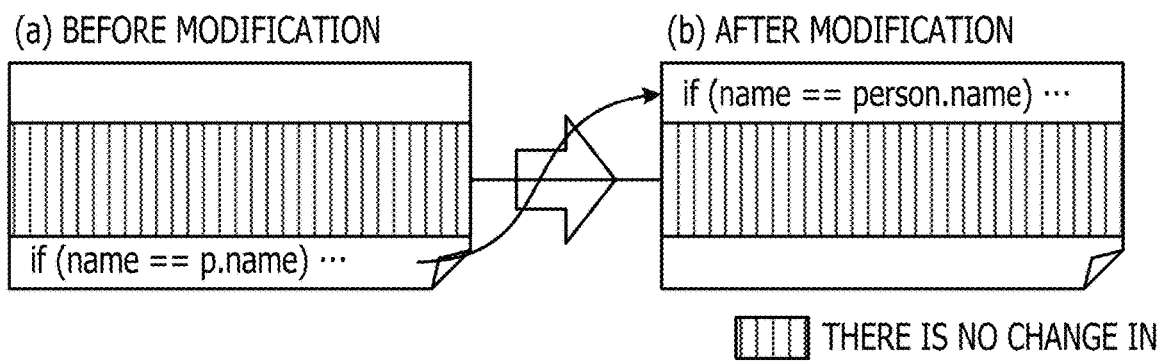
FIG. 13A is a first diagram illustrating a case where matching may not be achieved.
Figure 13B:
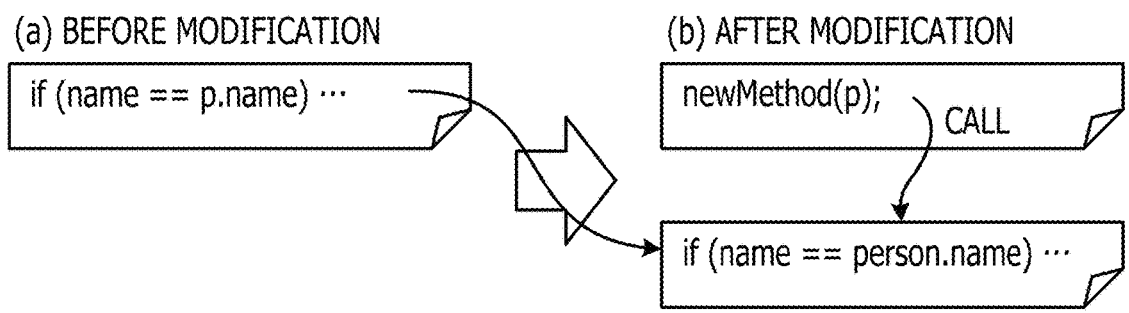
FIG. 13B is a second diagram illustrating a case where matching may not be achieved.

FIG. 12 is a diagram illustrating a hardware configuration of a computer that executes a warning matching program according to the embodiment. As illustrated in FIG. 12, a computer 50 includes a main memory 51, a central processing unit (CPU) 52, a local area network (LAN) interface 53, and a hard disk drive (HDD) 54. Also, the computer 50 includes a super input-output (IO) 55, a digital visual interface (DVI) 56, and an optical disk drive (ODD) 57.

The main memory 51 is a memory that stores a program, a halfway result of execution of the program, and the like. The CPU 52 is a central processing unit that reads and executes the program from the main memory 51. The CPU 52 includes a chipset having a memory controller.

The LAN interface 53 is an interface for connecting the computer 50 to another computer via a LAN. The HDD 54 is a disk device that stores programs and data, and the super IO 55 is an interface for connecting an input device such as a mouse and a keyboard. The DVI 56 is an interface for connecting a liquid crystal display device, and the ODD 57 is a device for reading and writing data to and from a digital versatile disc (DVD).

The LAN interface 53 is connected to the CPU 52 by peripheral component interconnect (PCI) express (PCIe), and the HDD 54 and the ODD 57 are connected to the CPU 52 by serial advanced technology attachment (SATA). The super IO 55 is connected to the CPU 52 by low pin count (LPC).

Then, the warning matching program executed by the computer 50 is stored in the DVD that is an example of a recording medium that may be read by the computer 50 and is read from the DVD by the ODD 57 to be installed to the computer 50. Alternatively, the warning matching program is stored in a database and the like of another computer system connected via the LAN interface 53 and is read from these databases to be installed to the computer 50. Then, the installed warning matching program is stored in the HDD 54 and read to the main memory 51, to be executed by the CPU 52.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a warning matching program for causing a computer to execute processing, the processing comprising:
   determining whether or not a pre-modification location and a post-modification location are used in same processing, the pre-modification location being a location in a pre-modification source code and being associated with a pre-modification warning outputted by a static analysis tool, the post-modification location being a location in a post-modification source code and being associated with a post-modification warning outputted by the static analysis tool; and
   associating the pre-modification warning with the post-modification warning based on a result of determining whether or not the pre-modification location and the post-modification location are used in the same processing,
   wherein the determining is configured to
   calculate a Dice similarity coefficient between tokens included in a pre-modification method and tokens included in a post-modification method, the pre-modification method being a part of the pre-modification source code and including the pre-modification location, the post-modification method being a part of the post-modification source code and including the post-modification location,
   determine whether the calculated Dice similarity coefficient is greater than a threshold, and
   in response to the calculated Dice similarity being greater than the threshold, determine that the pre-modification location and the post-modification location are used in the same processing.

2. The non-transitory computer-readable recording medium according to claim 1, wherein
in the determining, it is determined whether or not the pre-modification location and the post-modification location are used in the same processing based on whether or not a pre-modification method including the pre-modification location and a post-modification method including the post-modification location are same.

3. The non-transitory computer-readable recording medium according to claim 1, wherein
in the determining, it is determined whether or not the pre-modification location and the post-modification location are used in the same processing based on a call relationship between a pre-modification method including the pre-modification location and a post-modification method including the post-modification location.

4. The non-transitory computer-readable recording medium according to claim 3, wherein
in the determining, it is used as the call relationship whether or not a same method as the pre-modification method is included in the post-modification source code and the same method calls the post-modification method.

5. The non-transitory computer-readable recording medium according to claim 1, the processing further comprising
calculating a code similarity between a source code around the pre-modification location and a source code around the post-modification location, wherein
the determining is performed by the computer when the code similarity is greater than a predetermined threshold value.

6. A computer-based method of warning matching, the method comprising:
determining whether or not a pre-modification location and a post-modification location are used in same processing, the pre-modification location being a location in a pre-modification source code and being associated with a pre-modification warning outputted by a static analysis tool, the post-modification location being a location in a post-modification source code and being associated with a post-modification warning outputted by the static analysis tool; and
associating the pre-modification warning with the post-modification warning based on a result of determining whether or not the pre-modification location and the post-modification location are used in the same processing,
wherein the determining is configured to
calculate a Dice similarity coefficient between tokens included in a pre-modification method and tokens included in a post-modification method, the pre-modification method being a part of the pre-modification source code and including the pre-modification location, the post-modification method being a part of the post-modification source code and including the post-modification location,
determine whether the calculated Dice similarity coefficient is greater than a threshold, and
in response to the calculated Dice similarity being greater than the threshold, determine that the pre-modification location and the post-modification location are used in the same processing.

7. A warning matching device comprising:
a memory; and
a processor circuit coupled to the memory, the processor circuit being configured to perform processing, the processing including:
determining whether or not a pre-modification location and a post-modification location are used in same processing, the pre-modification location being a location in a pre-modification source code and being associated with a pre-modification warning outputted by a static analysis tool, the post-modification location being a location in a post-modification source code and being associated with a post-modification warning outputted by the static analysis tool; and
associating the pre-modification warning with the post-modification warning based on a result of determining whether or not the pre-modification location and the post-modification location are used in the same processing,
wherein the determining is configured to
calculate a Dice similarity coefficient between tokens included in a pre-modification method and tokens included in a post-modification method, the pre-modification method being a part of the pre-modification source code and including the pre-modification location, the post-modification method being a part of the post-modification source code and including the post-modification location,
determine whether the calculated Dice similarity coefficient is greater than a threshold, and
in response to the calculated Dice similarity being greater than the threshold, determine that the pre-modification location and the post-modification location are used in the same processing.

* * * * *